Patented June 2, 1942

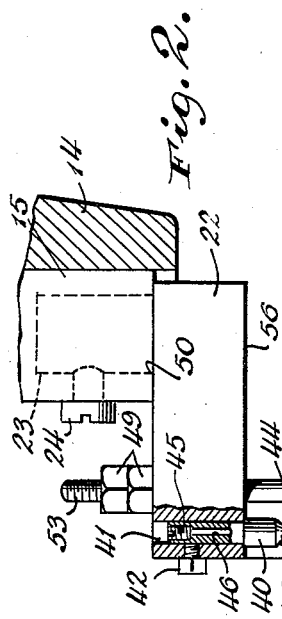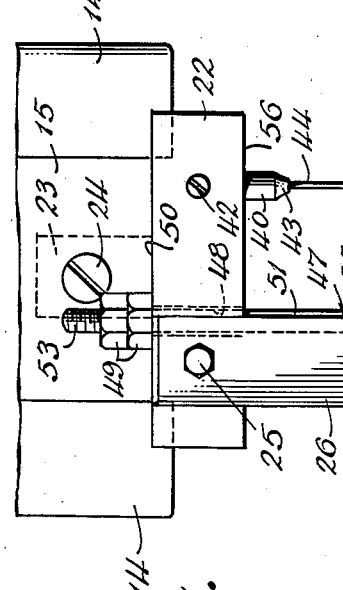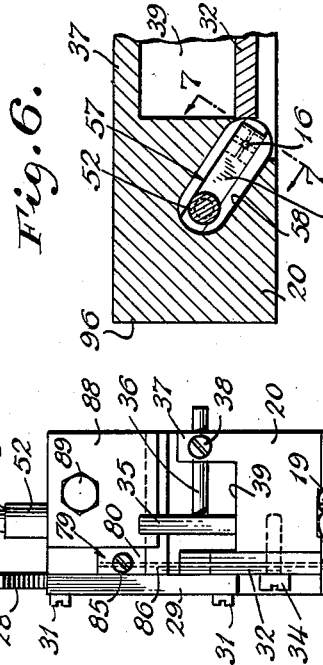

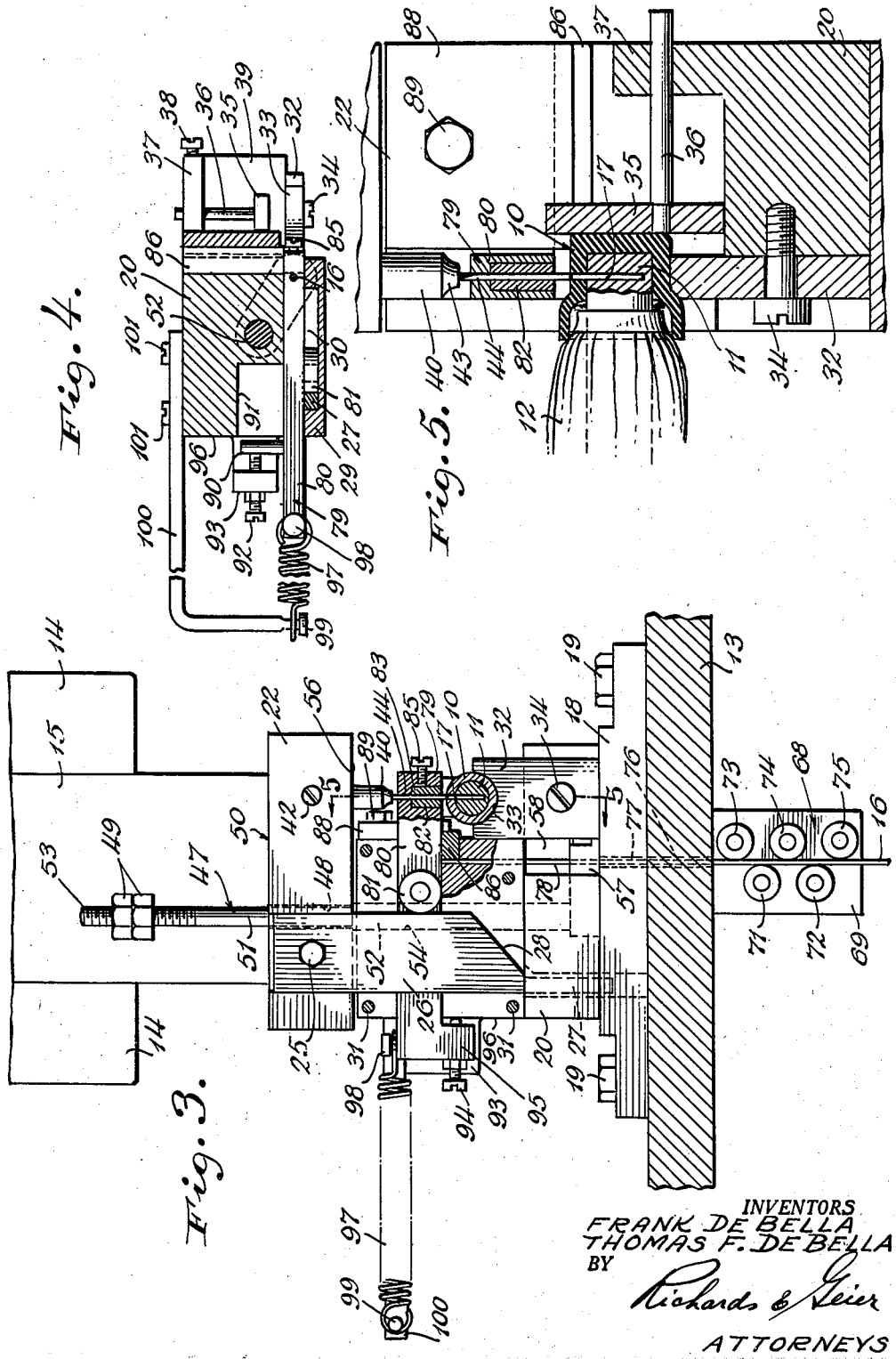

2,285,380

UNITED STATES PATENT OFFICE 2,285,380

FERRULE PINNING MACHINE

Frank De Bella, Newark, and Thomas F. De Bella, Elizabeth, N. J.

Application September 23, 1941, Serial No. 411,942

5 Claims. (Cl. 1—1)

This invention relates to a tip-mounting machine and refers more particularly to a machine for affixing tips or end pieces upon the ends of umbrella shanks and other articles of similar form.

The lower ends of umbrella shanks and the like are usually covered by cup-shaped tips which serve for the protection of these ends or as a support. Heretofore, these tips were glued to the shank ends by the operators. The operations of mounting and gluing the tips require a considerable expenditure of time and labor and often do not produce satisfactory results, since the tips are liable to become detached and to drop off the umbrella.

An object of the present invention is the provision of a machine for securing tips to the ends of shanks and the like.

Another object is the provision of mechanical means for attaching tips permanently and securely to the ends of shanks and the like.

A further object is the provision of a machine for attaching tips to the ends of shanks and the like by the use of securing means penetrating through the tips and the shank ends.

Other objects of the present invention will become apparent in the course of the following specification.

The objects of the present invention may be realized through the provision of a machine comprising a feeder for supplying a wire or similar securing means, a cutter for cutting off or shearing off a piece of wire of a required length, and a carrier supplying the cut-off wire piece to a driving element which causes the cut-off piece to penetrate through a tip and into a shank end and to be embedded in the shank end as permanent securing means firmly connecting the tip with the shank end. According to a preferred embodiment of the inventive idea, all the operations of the machine are caused by a press wherein a movable head is moved toward and away from an immovable base or anvil, a single slider member being used for operating said cutter and said carrier. The feeder, the slider and the driver reciprocate vertically, during the operation of the machine while the carrier reciprocates in a horizontal plane.

The invention will appear more clearly from the following detailed description when taken in connection with the accompanying drawings showing, by way of example, a preferred embodiment of the inventive idea.

In the drawings:

Figure 1 shows in front elevation a tip-affixing machine constructed in accordance with the principles of the present invention in its inoperative position, some parts being shown in section.

Figure 2 shows the machine in side elevation, some parts being shown in section.

Figure 3 shows the machine partly in section and partly in front elevation in its operative wire-inserting position.

Figure 4 is a horizontal transverse section along the line 4—4 of Figure 1.

Figure 5 is a vertical section along the line 5—5 of Figure 3, on an enlarged scale.

Figure 6 is a horizontal section along the line 6—6 of Figure 1.

Figure 7 is a section along the line 7—7 of Figure 6.

The machine shown in the drawings is used for securing cup-shaped tips 10 (Fig. 5) upon shank ends 11 of umbrellas 12.

The illustrated securing means consist of a wire 16 (Fig. 3) which is cut or sheared into securing elements or wire pieces 17. Each piece 17 is inserted through a wall of the tip 10 and into the shank end 11 of an umbrella, thus firmly holding the tip 10 upon the shank end 11.

The machine may be conveniently operated by any suitable type of press which is not shown in detail in the drawings and which includes a press base 13, a stationary frame 14 and a movable head 15 which is guided vertically by the frame 14 in the directions toward and away from the base 13.

The machine comprises a base plate 18 which is firmly secured to the press base 13 by bolts 19. An immovable frame 20 is mounted upon the plate 18 and is held thereon by screws 21 (Fig. 1).

The movable parts of the machine include a support 22 carrying a cylindrical member 23 which is firmly connected with the movable head 15 of the press by a screw 24. A bolt 25 connects the support 22 to the upper end of a slider 26 having the form of a plate provided with a lower narrow end 27 and an inclined cam surface 28.

The slider 26 is adapted to slide up and down along the vertical front surface of the frame 20 and is guided by a guide plate 29 which has an inner space 30 for the slider (Fig. 4) and which covers the front surface of the frame 20. The plate 29 is attached to the frame 20 by screws 31 (Fig. 1).

In operation, the umbrella end 11 is placed upon a socket 32 which has an upper semi-circular shank-supporting surface 33 and which is detachably connected to the frame 20 by a screw 34. The bottom of the cup-shaped tip 10 mounted on the umbrella end, rests against a stop plate 35 carrying a rod 36 (Fig. 2) which extends through a wall 37 constituting a part of the frame 20. A screw 38 carried by the wall 37 engages the rod 36 and thus holds the stop plate 35 in position. The stop plate 35 may be conveniently shifted upon a supporting surface 39 of the frame 20 when the screw 38 is unscrewed, so that the position of the stop plate 35 may be conveniently adjusted depending upon the size of the umbrella shanks and of the tips 10.

The wire-inserting means are carried by another part of the transverse movable support 22 and include a tube 40 fitting into a vertical opening 41 of the support 22 and held therein by a bolt 42. The lower tapered end 43 of the tube 40 is situated below the support 22. A passage 46 formed in the tube 40 contains an elongated inserting member or driver 44 which projects out of the tube 40 and is used to press wire pieces 17 against the tips 10 and to drive the pieces 17 through the tips 10 and into the shank ends 11. The upper end of the driver 44 is held in place by a screw 45 which is screwed into the upper threaded end of the passage 46. Due to this arrangement, a damaged driver 44 may be conveniently removed from the tube 40 and replaced by a new one.

A vertical rod 47 has an upper narrower portion 51 and a lower wider portion 52. The portion 51 of rod 47 extends with play through a passage 48 provided in the movable support 22. The upper end 53 of the rod 47 is threaded and carries nuts 49 which may be engaged by the upper horizontal surface 50 of the support 22 during the upward movement of the support. The lower wider portion 52 of the rod 47 extends through a passage 54 (Fig. 1) provided in the frame 20. An annular surface 55 on the upper end of the rod portion 52 is adapted to engage the lower horizontal surface 56 of the support 22.

The lower end of the rod 47 carries a wire feeder 57 which is movable along with the rod in a chamber 58 provided in the frame 20. The feeder 57, shown in detail in Figures 6 and 7, includes a hollow casing 59 having inner diverging walls 60 and 61, a top ledge 61a and a bottom 62 provided with an opening 63 for the passage of the wire 16. The interior of the casing 59 is closed by a leaf spring 64 carried by the casing 59 and having a passage 65 for the wire 16. Two rollers 66 and 67 are situated within the casing 59 on opposite sides of the wire 16. Due to this arrangement, the feeder 57 may move downwardly in relation to the wire 16, but during the relative upward movement of the feeder the rollers 66 and 67 will be clamped between the walls 60 and 61 and will clamp the wire 16, so that the latter will move upwardly along with the feeder. Thus a vertical reciprocatory movement of the feeder 57 will cause an upward step-wise feed movement of the wire 16.

The wire 16 is supplied to the feeder 57 from a source which is not shown in the drawings. The wire passes through a straightening device 68 (Figs. 1 and 2) comprising a bracket 69 which is attached to the underside of the press base 13 by a bolt 70. The bracket 69 carries rollers 71 and 72 situated on one side of the wire 16, and rollers 73, 74 and 75 situated on the other side of the wire 16, so that the wire 16 is straightened as it passes between the rollers.

The straightened wire 16 extends through a passage 76 provided in the press base 13 and through an alined passage 77 formed in the plate 18. The wire 16 passes through the chamber 58 and the feeder 57, extending through the passages 63 and 65 of the feeder and between the feeder rollers 66 and 67 (Fig. 7.) The wire 16 also extends through a vertical passage 78 provided in the frame 20 and into a wire cutting and feeding device 79 (Fig. 4).

The device 79 includes an elongated carrier 80 mounted for horizontal reciprocatory movement in a recess of the frame 20 and partly covered by the plate 29 which is attached to the frame 20. The member 80 carries a roller 81 which is engaged by the end 27, or the surface 28 or the near side surface of the slider 26 and which is free to move within the inner space 30 of the plate 29. The member 80 also carries an insert 82 which is situated in a recess 83 provided in the member 80 on opposite sides of a vertical passage 84 which may receive the upper end of the wire 16, as shown in Figure 1, and/or the lower end of the driver 44, as shown in Figure 3. The position of the insert 82 may be conveniently adjusted by a screw 85 carried by the member 80.

The insert 82 co-operates with a shearing member 86 during a movement of the carrier 80 in the direction of the arrow 87 shown in Figure 1, to shear off or cut off a piece 17 from the wire 16, the wire piece 17 being moved under the driver 44 by the carrier 80. Thus the insert 82 and the member 86 constitute a shearing device or a cutter. The shearing member 86 has the form of a block which is mounted in a recess of the frame 20 and is maintained in place by a plate 88 attached to the frame 20 by a bolt 89. Due to the provision of the plate 88 and the bolt 89, the shearing block 86 may be conveniently replaced by a new one, whenever necessary.

The member 80 carries upon its inner surface a stop or pin 90 (Fig. 4), and a chamber 91 is provided within the frame 20 to enable the pin 90 to move along with the carrier 80. The engagement of the pin 90 with a stop screw 92 limits the extent of movement of the carrier 80 in the direction opposite to that of the arrow 87. The screw 92 is carried by a bracket 93 which is firmly attached to the frame 20.

The carrier 80 is returned to its inoperative position shown in Figure 1 by a coiled expansion spring 97 one end of which is attached to a head 98 carried by the member 80. The opposite end of the spring 97 is attached to the end 99 of an angular bracket 100 which is attached to the frame 20 by screws 101 (Fig. 4).

The machine operates in the following manner:

When the slider 26 is in the raised position shown in Figure 1, the spring 97 maintains the carrier in a position in which the roller 81 is in engagement with the narrow end 27 of the slider and the passage 84 is situated directly above the passage 78 provided in the frame 20. The wire 16 passes from its source (not shown) between the rollers 71 and 72 on the one hand and the rollers 73, 74, and 75 on the other hand, of the straightening device 68. The wire 16 extends through the passage 76 of the base 13, the passage 77 of the plate 18 and the chamber 58 of the frame 20. As already stated, the wire 16 can move conveniently through the passages 63 and 65 and between the rollers 66 and 67 of the wire feeder 57 (Fig. 7), since the rollers 66 and 67 will not clamp the wire during its upward movement relatively to the rollers.

The wire 16 passes through the passage 78 of the frame 20 (Fig. 1) and into the passage 84 provided in the carrier 80 and the insert 82. The wire 16 fits fairly snugly in the passage 84.

A tip 10 is placed by hand over the shank end 11 of an umbrella 12 and the shank end 11 carrying the tip 10 is placed upon the semi-circular surface 33 of the socket 32, the bottom of the tip 10 being pressed against the stop plate 35. This is illustrated in Figure 5 of the drawings.

Then the machine-actuating press is operated so that its head 15 begins to move downwardly. As already stated, the head 15 is connected with the support 22 of the machine by the screw 24 and the member 23, while the support 22 carries the slider 26 and the driver-containing tube 40. Thus the slider 26 and the driver 44 move downwardly along with the support 22, this being the operative stroke or the forward movement of the driver 44.

During the downward movement of the lower end of the slider 26 within the space 30 of the plate 29 (Fig. 4), the inclined surface 28 of the slider 26 will engage the roller 81 of the carrier 80 and will shift the carrier 80 in the direction of the arrow 87 (Fig. 1), thereby expanding the spring 97. That end of the wire 16 which is situated in the passage 84, will be subjected to the shearing action of the adjacent edges of the insert 82 and the stationary member 86 and will be sheared off or cut off. The carrier 80 will continue to move in the direction of the arrow 87 until the surface 28 of the slider 26 has moved below the roller 81 and the carrier 80 has reached a position in which the sheared off wire piece 17 in the passage 84 is situated above the tip 10 and directly below the drive 44.

The vertical rod 47 does not participate in the downward movements of the members 22, 26 and 44 until the lower surface 56 of the support 22 strikes the annular surface 55 of the rod 47 due to frictional engagement of the rod portion 52 with the passage 54. During the balance of the downward movement of the support 22, the rod 47 moves downwardly along with the support. Since the feeder 57 is carried by the rod 47, the feeder 57 will move downwardly along with the rod. However, due to the form of the walls 60 and 61 of the feeder, it will move downwardly around the wire 16 extending through the feeder, without clamping the wire or causing it to participate in this downward movement.

The driver 44 which moves along with the support 22 will enter the passage 84 and engage the upper end of the cut-off wire piece 17. During the subsequent downward movement of the driver 44, it will press or drive the wire piece 17 through a wall of the tip 10 and into the shank end 11, thereby firmly connecting the tip with the shank. This is illustrated in Figure 3 of the drawings.

The return movement or stroke from the position shown in Figure 3 to the position shown in Figure 1 is caused by the upward movement of the press head 15. The support 22 moves upwardly along with the head 15. The driver 44 is withdrawn from the passage 84 of the carrier 80. During the upward movement of the slider 26, the expanded spring 97 will maintain the roller 81 in contact with the inclined surface 28 of the slider 26, thereby gradually moving the carrier 80 back to the position shown in Figure 1.

The rod 47 will not participate in the upward movement of the support 22 until the nut 49 strikes the upper surface 50 of the support. At that time, the horizontal return movement of the carrier 80 is substantially completed. During the rest of the upward movement of the support 22, the rod 47 and the feeder 57 carried thereby will move upwardly. As soon as the upward movement of the feeder 57 is started, the rollers 66 and 67 will clamp the wire 16 and will pull the wire 16 along with them in the course of their upward movement. At the termination of the upward movement, the upper end of the wire 16 will be inserted into the passage 84 of the carrier 80 (Fig. 1).

The machine is then ready for the next operation.

Various parts of the machine may be conveniently replaced by new ones whenever they are worn out or damaged and the extent of movement of the different parts may be adjusted by the described stop screws and nuts. The described machine is particularly suitable for mass production, since it has few parts, is easy to operate and does not require any particular attention and care.

It is apparent that the specific illustration shown above has been given by way of illustration and not by way of limitation and that the structures above described are subject to wide variation and modification without departing from the scope or intent of the invention. All of such and other variations and modifications are to be included within the scope of the present invention.

What is claimed is:

1. A tip-affixing machine, comprising a reciprocable support carrying out an operative movement and a return movement, a tubular member, means detachably connecting said member with said support, an elongated driver, means detachably holding an end of said driver in said member, said driver being movable along with said support, a reciprocable shearing and feeding device, means actuated by said support to supply elongated securing means to said shearing and feeding device during said return movement, and a slider attached to said support and movable therewith and having a cam surface engaging said shearing and feeding device and actuating the same to shear off a piece of said securing means and to supply the sheared off piece into the path of said driver during said operative movement, whereby said driver inserts said sheared off piece into a work piece during said operative movement.

2. A tip-affixing machine, comprising a reciprocable support carrying out an operative movement and a return movement, a driver, means detachably supporting said driver upon one part of said support, a shearing and feeding device reciprocable transversely to the directions of movement of said support, means actuated by said support to supply elongated securing means to said shearing and feeding device during said return movement, a slider attached to another part of said support and movable therewith and having a narrow end portion, a wider portion and a slanting cam surface situated between said portions, and means constituting a guide for said slider and a separate guide for said shearing and feeding device, said cam surface engaging said shearing and feeding device and actuating the same to shear off a piece of said securing means by pressing the securing means movable along with said shearing and feeding device against a part of said guide means, said cam surface further moving said shearing and feeding device to supply the sheared off piece into the path of said driver during said operative movement, whereby said driver inserts said sheared off piece into a work piece during said operative movement.

3. A tip-affixing machine, comprising a reciprocable driver carrying out an operative movement and a return movement, an elongated carrier reciprocable transversely to said driver, an insert mounted in said carrier, an opening being formed in said insert, means connected with said driver to insert elongated securing means into said opening, a roller carried by said carrier, means movable along with said driver and having a cam surface for engaging said roller to move said carrier, an immovable shearing member co-operative with said insert during this movement of the carrier to shear off the piece of said securing means which is situated in said opening, said cam surface further moving said carrier to supply the sheared off piece into the path of said driver during the operative movement thereof, whereby said driver is inserted into said opening and drives said sheared off piece into a work piece during said operative movement, and a frame carrying said shearing member and constituting a guide for said carrier.

4. A tip-affixing machine, comprising a transverse reciprocable support carrying out an operative movement and a return movement, a driver, means supporting said driver upon said support, said driver being movable along with said support, a shearing and feeding device reciprocable transversely to the directions of movement of said support, a frame constituting a guide for said shearing and feeding device and having formed therein an elongated opening and a chamber communicating with said opening, said support having an opening formed therein which is narrower than and in alinement with the opening formed in said frame, a rod having a wider portion extending with play through the opening formed in said frame, said wider portion having an end surface situated outside of said frame and engaged by said support during the operative movement thereof, whereby said rod moves along with said support during a part of said operative movement, said rod further having a narrower portion extending with play through the opening formed in said support, and projecting therethrough, a stop member carried by the projecting portion of said rod and engaged by said support during its return movement, whereby said rod moves along with said support during a part of said return movement, a feeder carried by said rod and reciprocable therewith in said chamber, said feeder supplying elongated securing means to said shearing and feeding device while said rod moves along with said support during said return movement, and means carried by said support and movable therewith and having a cam surface engaging said shearing and feeding device and actuating the same to shear off a piece of said securing means and to supply the sheared off piece into the path of said driver during said operative movement, whereby said driver inserts said sheared off piece into a work piece during said operative movement.

5. A tip-affixing machine, comprising a reciprocable driver carrying out an operative movement and a return movement, a reciprocable shearing and feeding device, having a wire-carrying opening formed therein, means constituting a guide for said shearing and feeding device and having a passage formed in said means, said passage communicating with said opening in an inoperative position of said shearing and feeding device, a wire straightener carried by said means adjacent another end of said passage, means connected with said driver to supply a wire through said wire straightener and said passage and into said opening during said return movement, a shearing member carried by the first-mentioned means and having an edge situated in the path of said wire during a forward movement of said shearing and feeding device, and means movable along with said driver and having a cam surface engaging said shearing and feeding device and causing said forward movement thereof to shear off a piece of wire and bring the sheared off piece situated in said opening into the path of said driver during the operative movement thereof, whereby said driver is inserted into said opening and drives said sheared off wire piece into a work piece during said operative movement.

FRANK DE BELLA.
THOMAS F. DE BELLA.